Dec. 9, 1958
M. E. GISH
2,863,258
DIGGING APPARATUS
Filed July 24, 1957
3 Sheets-Sheet 1
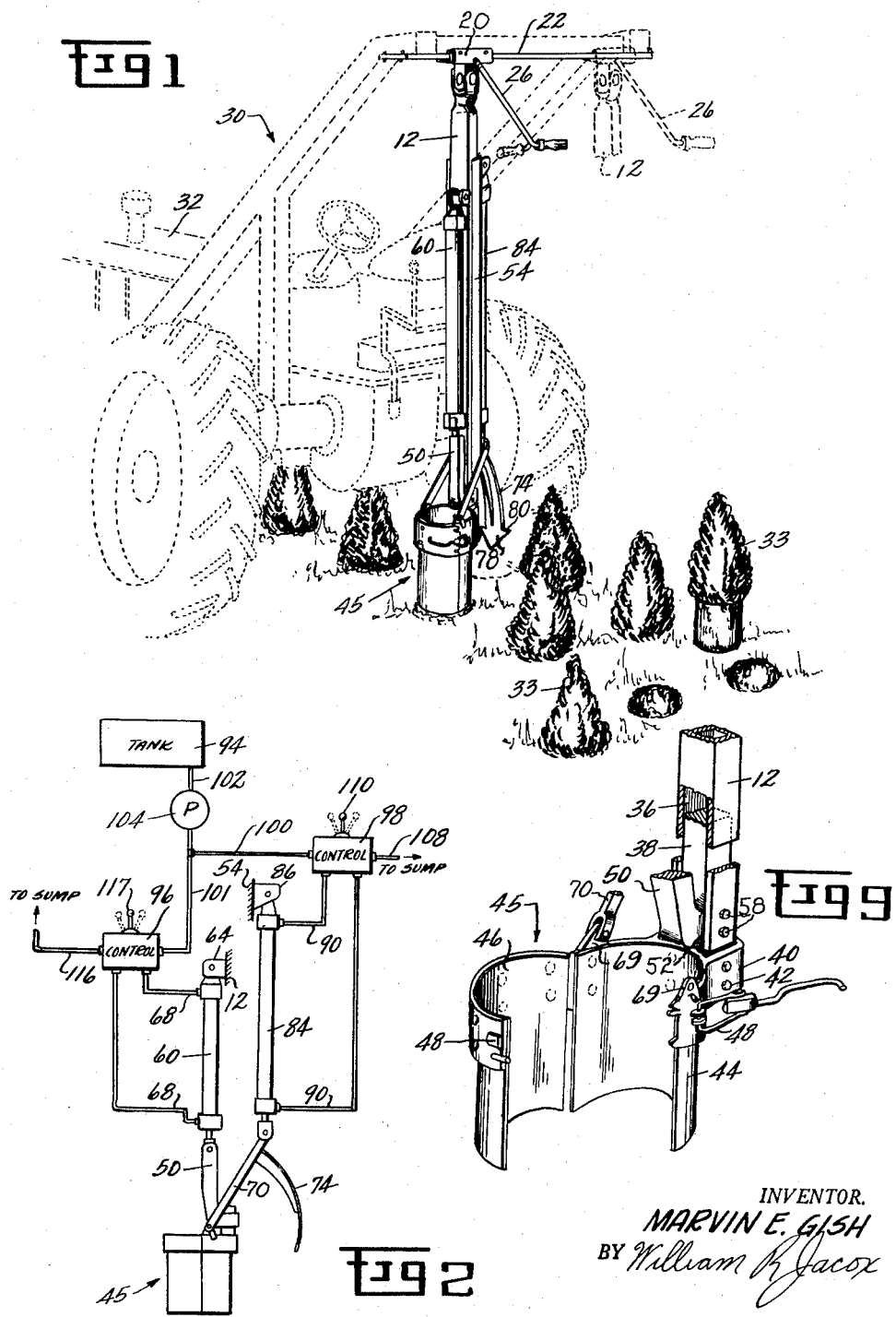
INVENTOR.
MARVIN E. GISH
BY William R. Jacox
ATTORNEYS

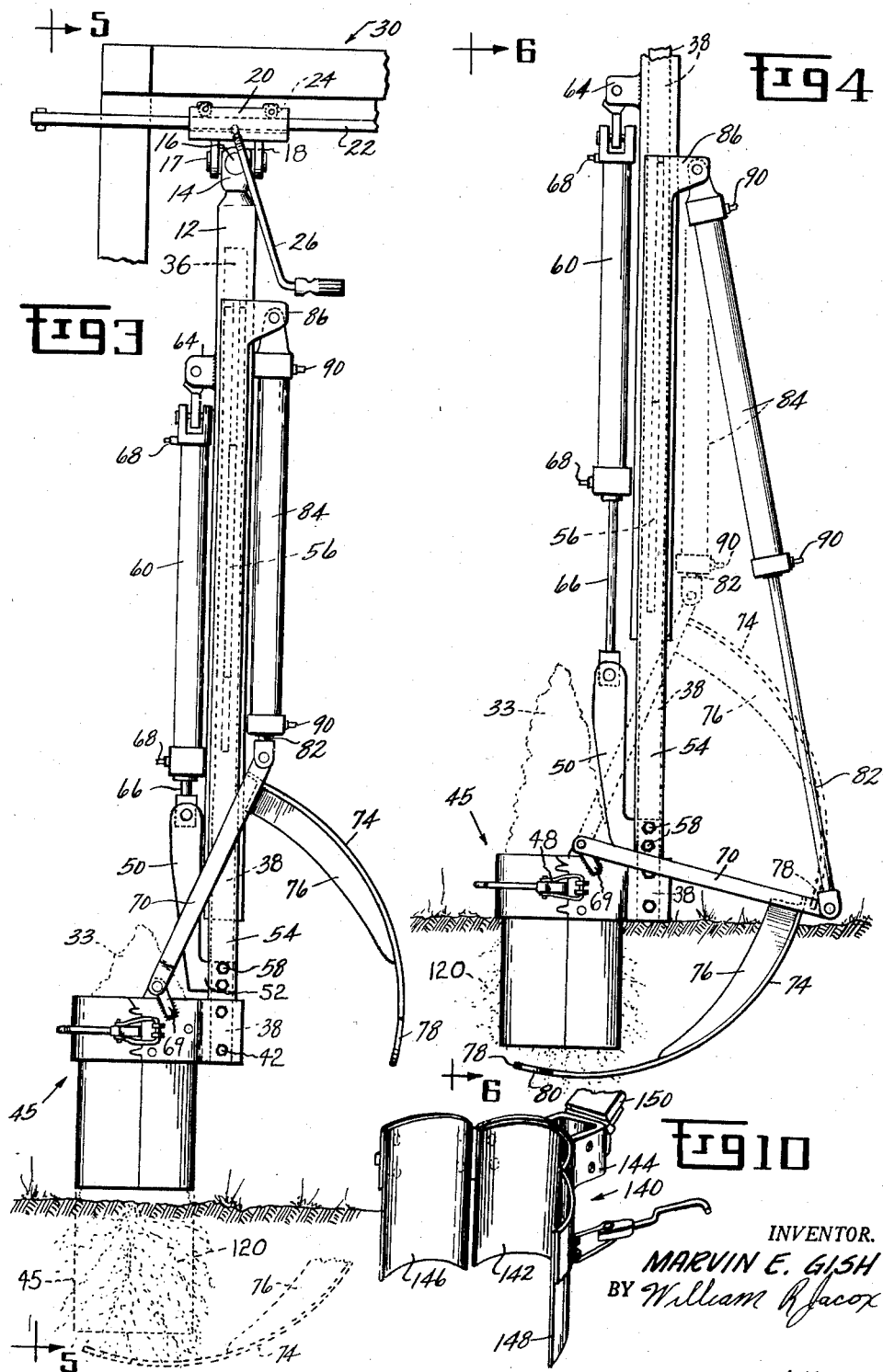

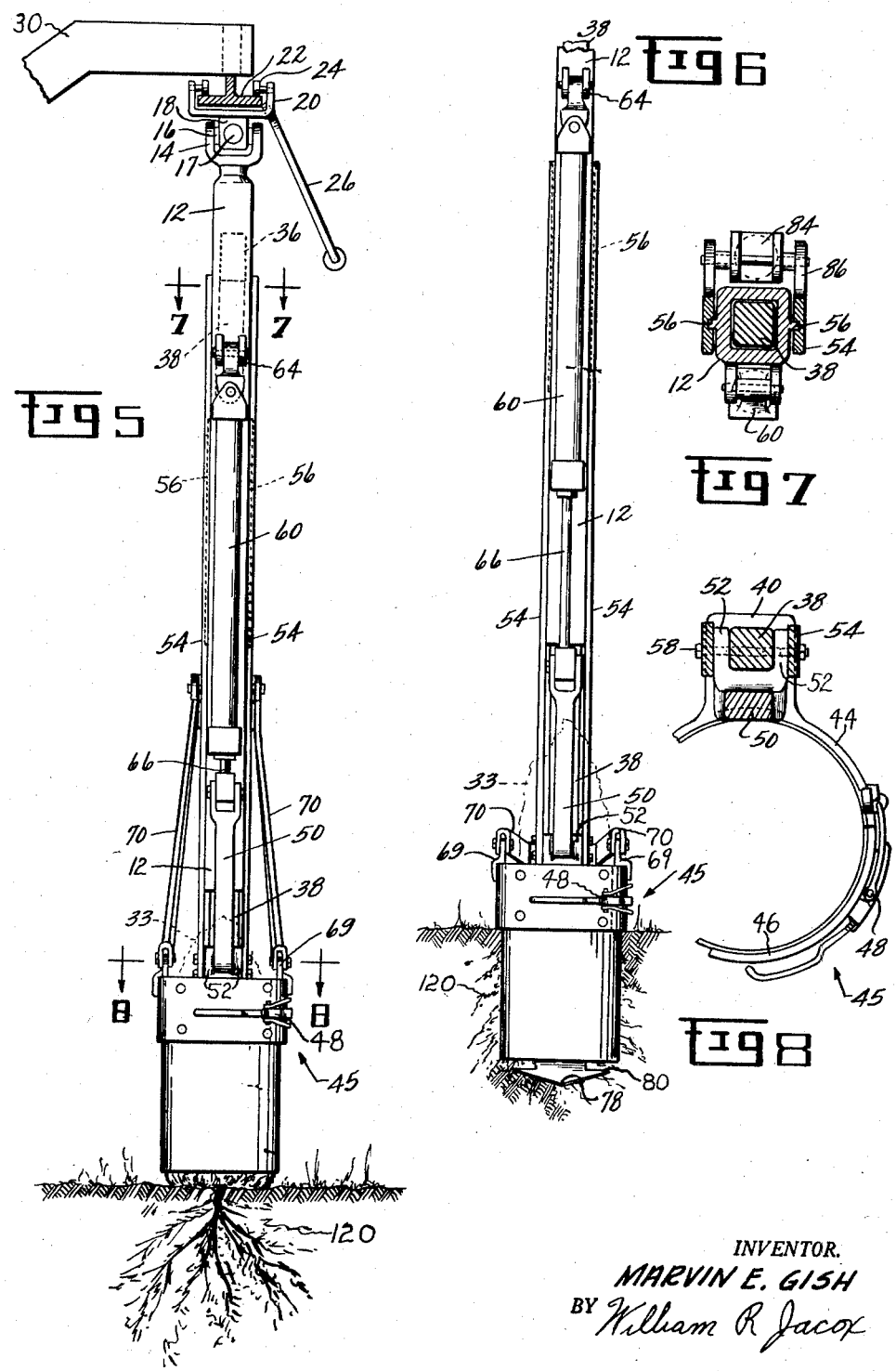

United States Patent Office 2,863,258
Patented Dec. 9, 1958

2,863,258

DIGGING APPARATUS

Marvin E. Gish, near Tipp City, Ohio, assignor of one-half to Charles J. Deeter, Clayton, Ohio Application July 24, 1957, Serial No. 673,897

10 Claims. (Cl. 47—37)

This invention relates to a digging apparatus. The invention relates more particularly to a digging apparatus for the removal of small trees, plants and the like from the ground for the transplanting thereof. The invention relates still more particularly to a machine for balling the earth around the roots of the small tree or plant during the removal thereof from the ground.

An object of this invention is to provide a digging apparatus for small trees or shrubs or the like which may be carried by a propelling machine and operated therefrom.

Another object of this invention is to provide a balling machine which may be movably attached to a support structure.

Another object of this invention is to provide a digging apparatus which neatly severs the end portions of the roots of the plant during the operation thereof.

Another object of this invention is to provide such a digging apparatus which is readily and easily operable in numerous types of soils.

Another object of this invention is to provide balling apparatus which cuts the earth around the roots of the plant and also cuts the earth under the roots of the plant during the operation thereof.

Another object of this invention is to provide balling apparatus which lifts the ball and the plant from the ground after the cutting operation.

Another object of this invention is to provide balling apparatus from which the plant is easily and readily removed after the digging and lifting of the plant from the ground.

Another object of this invention is to provide such a digging apparatus which is readily, easily, and speedily operable and which causes no injury to the plant during the digging thereof.

Another object of this invention is to provide such a digging apparatus which is easily operable by one or two persons.

Another object of this invention is to provide such a digging aparatus which is easily and readily operated and controlled.

Another object of this invention is to provide such a digging apparatus in which numerous types of operating means may be used.

Other objects and advantages reside in the construction of parts, the combination thereof, the method of manufacture, and the mode of operation, as will become more apparent from the following description.

In the drawings:

Figure 1 is a perspective view showing a digging apparatus of this invention carried by a support structure attached to a tractor.

Figure 2 is a diagrammatic view of a control assembly which may be applied for operation of a digging apparatus of this invention.

Figure 3 is an enlarged side elevational view of a digging apparatus of this invention, with all of the elements thereof disposed above the ground.

Figure 4 is a side elevational view of the digging apparatus of this invention, similar to Figure 3, but with the cutting elements of the apparatus in the ground during operation thereof.

Figure 5 is a view taken substantially on line 5—5 of Figure 3.

Figure 6 is a view taken substantially on line 6—6 of Figure 4.

Figure 7 is an enlarged sectional view taken substantially on line 7—7 of Figure 5.

Figure 8 is an enlarged sectional view, with parts broken away, taken substantially on line 8—8 of Figure 5.

Figure 9 is an enlarged fragmentary perspective view showing a preferred embodiment of a bucket mechanism of the digging apparatus of this invention.

Figure 10 is an enlarged fragmentary perspective view showing a preferred modification of a bucket mechanism of the digging apparatus of this invention.

Referring to the drawings in detail, a digging apparatus of this invention comprises an elongate support body or post member 12. The post member 12 is adapted to be suspended and supported by any suitable structure. Herein the upper portion of the post 12 is shown as being provided with a bifurcated portion 14 to which is attached a pin 16. The pin 16 is pivotally attached to a pin 17, normal thereto, of a yoke 18. The yoke 18 is attached to a shoe 20. Thus, the post 12 is pivotally movable about a plurality of axes as the post 12 is carried by the shoe 20 through the pins 16 and 17.

The shoe 20 is movably supported upon a rail 22. The shoe 20 is shown as being provided with a plurality of rollers 24 for movement thereof upon the rail 22.

A rod 26 extending angularly downwardly from the shoe 20 is threadedly carried by the shoe 20 and by rotation thereof the rod 26 is engageable with the rail 22 for locking the position of the shoe 20 with respect to the rail 22.

As shown in Figure 1, the rail 22 is supported by a structure 30 which is attached to a tractor 32. Therefore, the post 12 is movable laterally as the shoe 20 moves upon the rail 22 so that the apparatus may be used to dig plants from a plurality of rows thereof as the wheels of the tractor 32 straddle the rows of plants or small trees, herein referred to by numeral 33.

The post 12 normally extends vertically downwardly from the rail 22 and is provided with an elongate cavity 36 therein open at the bottom end thereof and extending most of the length thereof, as shown in Figures 5, 7, and 9.

Slidably movable within the cavity 36 of the post 12 is an elongate slide bar 38. The bar 38 extends downwardly from the post 12. The lower end of the slide bar 38 is disposed within a bracket 40 and attached thereto by means of bolts 42, as shown in Figures 8 and 9.

Attached to the bracket 40 by any suitable means such as welding or the like and extending therefrom is an arcuate bucket half 44 which is a part of a cutter knife or bucket 45. Hingedly attached to the bucket half 44 is an arcuate bucket half 46. The bucket halves 44 and 46 are open at the bottom thereof and the lower edges thereof are keen and sharp. The bucket 45 is opened by pivotal movement of the bucket half 46 as shown in Figure 9, or the bucket half 46 may be moved to closed position as shown in Figures 1, 3, 4, 5, and 6. The bucket halves 44 and 46 are secured in closed position by means of a latch 48, a portion of which is attached to each of the bucket halves 44 and 46.

As shown in Figures 3, 4, and 9, extending angularly upwardly from the bracket 40 is a connector bar or link 50. The connector link 50 is provided at the lower end thereof with a yoke 52 having legs which straddle the slide bar 38 immediately above the bracket 40, as best shown in Figure 8. Attached to the yoke 52 of the connector link 50 at either side thereof and extending upwardly therefrom is a frame comprising a pair of slide channel members 54 which slidably engage the post 12 at opposite surfaces thereof. These opposite surfaces of the post 12 are provided with elongate guide protuberances 56 which are firmly attached thereto. Each of the slide channels 54, as best shown in Figure 7, has a groove complementary to its respective guide protuberance 56 so that the slide channels 54 in the movement thereof, are guided by the protuberances 56.

As shown in Figure 8, the lower ends of the slide channels 54 are attached to the yoke 52 by means of bolt members 58, each of which extends through one of the slide channels 54, through a leg of the yoke 52, and into the slide bar 38. Thus, the slide channels 54 are rigidly attached to the slide bar 38 for movement therewith with respect to the post 12.

A fluid motor 60 has the upper end thereof attached to the post 12 by means of a connector 64 at a side thereof intermediate the slide channels 54. The fluid motor 60 has an actuator rod 66 which is operable thereby and extends downwardly therefrom. The lower end of the actuator rod 66 is attached to the upper end of the connector link 50. Thus, operation of the fluid motor 60 causes reciprocal movement of the slide bar 38, thus providing movement to the bucket member 45. The fluid motor 60 is provided with fluid conduits 68, there being one fluid conduit 68 at each end thereof adapted for connection to any suitable source of fluid for operation of the motor 60.

At opposite portions of the bucket half 44 are rigidly attached lug members 69 to which are pivotally attached arm members 70 which extend from the bucket 45. Attached to the arms 70 and disposed therebetween adjacent the extending ends thereof is an arcuate knife or undercutter member 74. The undercutter member 74 is provided with a brace 76 along a portion of the length thereof. The end of the undercutter member 74 is provided with any suitable cutting edge. Herein the cutter member 74 is shown as being provided with a cutter point 78 having reverse cutting shoulders 80, as best shown in Figure 1.

Attached to the ends of the arms 70 adjacent the cutter member 74 is an actuator rod 82 of a fluid motor 84. The fluid motor 84 has the upper end thereof pivotally attached to a pair of lug portions 86 which are rigidly attached to the slide channels 54 and extend laterally therefrom at the upper ends thereof. Thus, it is understood that reciprocal movement of the slide bar 38 and the slide channels 54 carries the fluid motor 84 along with the cutter member 74. The cutter member 74 is normally retained in its uppermost position as shown in Figure 3. Each end of the fluid motor 84 is provided with a fluid conduit 90 extending therefrom and adapted to connect to a source of fluid for operation of the fluid motor 84.

In Figure 2 a schematic fluid circuit diagram which may be used in the operation of the fluid motors 60 and 84 is shown. A fluid supply tank 94 connects to control valve assembly boxes 96 and 98 by means of conduits 100, 101, and 102. A fluid pump 104 is shown connected intermediate the ends of the conduit 102 for forcing fluid from the tank 94 to the control boxes 96 and 98.

The control valve box 98 also has a conduit 108 for return of fluid to a sump or directly to the tank 94. The conduits 90 extending from the fluid motor 84 connect to the control box 98.

The control valve box 98 has a control lever 110 which may be moved in one direction to provide fluid pressure to the upper end of the fluid motor 84 and may be moved in the other direction to provide fluid pressure to the lower end of the fluid motor 84.

As discussed above, the fluid motor 60 has fluid conduits 68 extending therefrom, there being one conduit 68 extending from each end of the motor 60. These conduits 68 connect to the control box 96. A return conduit 116 is also attached to the control box 96 for connection to a sump or directly to the tank 94. The control valve assembly box 96 is provided with an operating lever 117.

Operation

As shown in Figure 1, the digging apparatus of this invention is carried by a support structure 30 attached to the tractor 32 and the post 12 is movable laterally across the rearward portion of the tractor 32 as the post 12 is carried by the shoe 20 and the rail 22. Preferably a tractor such as the tractor 32 is employed which has sufficient width and height to permit the tractor 32 to straddle a plurality of rows of plants such as the small trees or plants 33 shown in Figure 1.

With the tractor positioned so that a plurality of rows of plants or trees 33 are straddled as shown in Figure 1, the post 12 is moved along the rail 22, carried by the shoe 20, until the post 12 is disposed substantially above one of the plants or trees 33. As the bucket 45 approaches the plant 33 which is to be dug, the bucket 45 may be closed and moved vertically downwardly to encompass one of the plants 33. If desired, the bucket 45 may laterally approach the plant 33 which is to be dug with the bucket half 46 in an open position. Then after the bucket half 44 is in a position partially encompassing the plant 33, the bucket half 46 is closed, completing the enclosure of the plant 33.

If desired, the rod 26 of the shoe 20 may be rotated to threadedly move the rod 26 into engagement with the rail 22 to lock the position of the shoe 20 with respect to the rail 22.

After the bucket 45 is positioned in encompassing position around one of the plants 33 as shown in Figures 1, 3, and 5, the fluid motor 60 is operated by movement of the lever 117 of the control valve box 96, thus causing the actuator rod 66 to move vertically downwardly. Thus, the slide bar 38 within the post 12 and the slide channels 54 exterior thereof are moved vertically downwardly as the slide bar 38 and the slide channels 54 are slidably carried by the post 12. Thus, the bucket member 45 is forced into the ground as the cutting edges at the lower portion thereof cut into the ground, as shown in Figures 4 and 6 and as shown in dotted lines in Figure 3.

Due to the fact that the fluid motor 84 is carried by the slide channels 54, the fluid motor 84 is moved downwardly with downward movement of the bucket 45. However, the fluid motor 84 is inoperative during its movement with the slide channels 54, and the undercutter member 74 remains in its upward position as the bucket 45 cuts into the ground, as shown by dotted lines in Figure 4. Thus, the earth around roots 120 of the plant 33 is cut and a portion of the ends of the roots is severed.

Then the fluid motor 84 is operated by movement of the operating lever 110 of the control box 98, causing downward movement of the actuator rod 82. Due to the fact that the arms 70 are pivotally attached to the bucket 45, the fluid motor 84 is caused to pivotally move, as shown in Figure 4, when the fluid motor 84 is operated. Thus, the undercutter member 74 is forced into the ground so that the cutter point 78 moves under the bucket 45, as shown in Figures 4 and 6, thus cutting the earth under the roots of the plant 33 and a portion of the lower ends of the roots. Thus, when the bucket 45 and the cutter member 74 are moved to positions shown in Figures 4 and 6 all of the earth around the roots is cut.

Then the fluid motor 84 is operated by means of the lever 110 of the control valve assembly box 98 so that the actuator rod 82 is moved upwardly, withdrawing the undercutter member 74 from the ground. During the withdrawing of the cutter member 74 the laterally extending reverse cutter shoulder portions 80 shown in Figures 1 and 6 serve as cutting members to further sever portions of the roots of the plant which may not have been completely cut during the inward movement of the cutter point 78.

After the undercutter member 74 is withdrawn from the ground, the fluid motor 60 is again operated by means of the lever 117 of the control valve box 96 so that the actuator rod 66 is moved upwardly carrying therewith the slide bar 38, the slide channels 54, and the bucket 45. Upward movement of the bucket 45 carries therewith a ball of earth with roots of the plant 33. As the bucket 45 is again returned to the surface of the ground, the post 12 may be pivotally moved to a position adjacent the hole which has been formed so that the ball of earth and the plant 33 may be set upon the ground adjacent the hole formed by the removal of the plant 33. Then the latch 48 is released and the bucket half 46 is pivotally moved to open position, as shown in Figure 9, so that the ball of earth and the plant 33 are released from the bucket 45 and the plant 33 is set adjacent the hole formed by the removal thereof, as shown in Figure 1.

When it is desired to move the digging apparatus to another plant 33 for the digging thereof the rod member 26 is rotated from engagement with the rail 22 releasing the shoe member 20 for movement along the rail 22. Furthermore, if necessary, the tractor 32 is moved to position the post 12 above a plant 33 which is to be removed from the ground.

Thus, it is understood that the digging apparatus of this invention provides means by which plants, small trees, and the like may be quickly and easily dug from the ground with a ball of earth encompassing the roots of the plant. The plants are cleanly and quickly removed from the ground without injury to the plants. The earth around the plant and below the plant is neatly cut so that a well shaped ball of earth is removed with removal of the plant from the ground.

It is to be understood that, if so desired, the digging apparatus of this invention may be carried by any suitable support structure other than the support structure 30 of the tractor 32.

Figure 10 shows a preferred modification of a bucket member of this invention. In Figure 10 a bucket member 140, also open at the bottom, is shown which is provided with an arcuate bucket portion 142 attached to a bracket 144. The bucket member 140 also has bucket portions 146 and 148 attached to the bucket portion 142 so that each of the portions 142, 146, and 148 form substantially one-third of the bucket 140. The bucket portions 146 and 148 are pivotally attached to the portion 142 and provide means by which a complete opening of the bucket 140 may be obtained for removal of a plant therefrom or for the encompassing of a plant for the digging thereof.

An undercutter arm 150, shown in fragment in Figure 10, is pivotally attached to the bracket 144. The arm 150 is thus attached to an actuator rod of a fluid motor such as the fluid motor 84 for operation of an undercutter.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a balling machine, support structure, a horizontal rail carried by the support structure, a shoe movably carried by the rail along the length thereof, an elongate support body attached at one end thereof to the shoe and extending downwardly therefrom, the support body having a cavity therein open at the lower end thereof and extending a portion of the length of the body, a bar slidably movable within the cavity and extending downwardly from the body through the open end thereof, an elongate frame attached to the bar adjacent the lower end thereof, the frame slidably extending along opposite sides of the support body, means attached to said opposite sides of the support body guiding sliding movement of the frame, a first fluid motor, the first fluid motor being attached to the support body, the first fluid motor having an actuator member extending therefrom, means attaching the actuator member to the bar and frame, a vertically extending hollow cylindrical knife attached to the bar and frame, the knife thus being movable with movement of the bar and frame, a second fluid motor, the second fluid motor being pivotally attached to the frame adjacent the upper end thereof, the second fluid motor having an actuator rod movably extending therefrom, an arm pivotally attached to said knife and to the actuator rod of the second fluid motor, a cutter member attached to the arm and movable therewith, the cutter member being movable to a position below the cylindrical knife upon pivotal movement of the arm by operation of the second fluid motor.

2. A balling machine comprising support structure, an elongate body attached to the support structure, an auxiliary support structure slidably attached to the elongate body and movable along the length thereof, a fluid motor attached to the elongate body and to the auxiliary support structure, the fluid motor being operable to move the auxiliary support structure with respect to the elongate body, a container member attached to the auxiliary support structure adjacent one end thereof, the container member being open at opposite ends thereof and having side walls, the end of one of the side walls being sharp, an auxiliary cutter assembly pivotally carried by the auxiliary support structure, a second fluid motor, the second fluid motor being supported by the auxiliary support structure and operably connected to the auxiliary cutter assembly, the auxiliary cutter assembly having a sharp edge portion movable substantially normal to the side walls and to a position adjacent the end of the side walls which is sharp.

3. An earth digging apparatus comprising support structure, a post pivotally attached to the support structure and suspended therefrom, the post having a cavity therein open at the bottom end thereof and extending a portion of the length thereof, a bar slidably movable within the cavity and extending from the lower end of the post, a fluid motor carried by the post and attached to the bar for movement thereof with respect to the post, a bucket carried by the bar and movable therewith, the bucket being open at the bottom thereof, a cutter member pivotally attached to the bucket and movable to a position below the bucket, a second fluid motor, the second fluid motor being carried by the bar and connected to the cutter member for operation thereof.

4. A machine for digging small trees, bushes, and the like for the transplanting thereof, the combination comprising a post, the post having a cavity therein extending a portion of the length thereof and open at one end thereof, a bar slidably positioned within the cavity and extending from the post through the open end thereof, a connector link attached to the bar intermediate the ends thereof, a fluid motor attached to the connector link and to the post for movement of the bar, a slide channel attached to the link and to the bar, the slide channel extending along the exterior surface of the post, the post being provided with a guide protuberance slidably engageable by the slide channel, a second fluid motor, the second fluid motor being attached to the slide channel and movable therewith, a cutter bucket attached to the bar, an arm pivotally attached to the second fluid motor and to the cutter bucket, and an undercutter member attached to the arms and movable therewith.

5. A balling machine for plants comprising a support body, an auxiliary support member slidably movable with respect to the support body, a tubular cutter member attached to the auxiliary support member and movable therewith, the tubular cutter member being capable of encompassing a plant, motor means attached to the support body and to the auxiliary support member for movement of the tubular cutter member with respect to the support body, a second cutter member, the second cutter member being movable about an axis normal to the longitudinal axis of the tubular cutter member, the second cutter member being movable to a position at one end of the tubular cutter member, and motor means attached to the second cutter member for movement thereof.

6. Balling apparatus adapted to be carried by a tractor and the like having support structure attached thereto, the combination including a rail attached to the support structure, a shoe movable upon the rail, a post pivotally attached to the shoe and carried thereby, bar means slidably carried by the post and movable with respect thereto, a cutter tube attached to the bar means for movement therewith, motor means attached to the bar means for movement thereof, a cutter knife carried by the bar means and operably movable to a position at one end of the cutter tube, and motor means carried by the bar means and attached to the cutter knife for operation thereof.

7. A digging machine for attachment to a vehicle for carrying thereby comprising support means, an auxiliary support member carried by the support means and movable with respect thereto, first cutter means, the first cutter means being attached to the auxiliary support member and movable therewith, second cutter means carried by the auxiliary support member and having cutting movement about an axis substantially normal to the line of cutting movement of the first cutter means, the second cutter means being movable to a position in the line of movement of the first cutter means, and motor means for operation of the cutter means.

8. In a balling apparatus adapted to be carried by a vehicle, support structure, a first cutter member and a second cutter member carried by the support structure, the second cutter member being pivotally movable about an axis substantially normal to the line of movement of the first cutter member, and motor means attached to the cutter members for operation thereof.

9. Digging apparatus for plants comprising a first cutter member, the first cutter member also being a carrier member, means for forcing the first cutter member into the earth, a second cutter member, the second cutter member being movable about an axis substantially normal to the line of movement of the first cutter member, means for forcing the second cutter member into the earth to a position below the first cutter member after the first cutter member is forced into the earth, the last said means also removing the second cutter member from the earth before the first cutter member is removed from the earth, the first said means removing the first cutter member from the earth after the second cutter member is removed from the earth, the first cutter member carrying a ball of earth therewith.

10. Balling apparatus for plants, the combination comprising support means, first and second cutter members, each cutter member being separately operable, the first cutter member being vertically movable into the earth, the second cutter member being movable about an axis substantially normal to the line of movement of the first cutter member, means for movement of the second cutter member into the earth and out of the earth after the first cutter member is forced into the earth and before the first cutter member is removed from the earth, the cutter members being operable to cut a ball of earth in the ground, the first cutter member being the sole carrier member for carrying a ball of earth after it is cut.

References Cited in the file of this patent

UNITED STATES PATENTS

| | | |
|---|---|---|
| 310,592 | Johnson | Jan. 13, 1885 |
| 594,668 | Wilkens | Nov. 30, 1897 |
| 1,597,281 | Mills | Aug. 24, 1926 |
| 1,814,216 | Hartwell | July 14, 1931 |
| 2,243,955 | Gwathmey | June 3, 1941 |
| 2,769,278 | Wassel | Nov. 6, 1956 |

FOREIGN PATENTS

| | | |
|---|---|---|
| 17,961 | Australia | of 1934 |
| 291,095 | Germany | Apr. 1, 1916 |